(12) United States Patent
Maeder et al.

(10) Patent No.: US 11,102,632 B2
(45) Date of Patent: Aug. 24, 2021

(54) ACCESS MECHANISM FOR SINGLE PURPOSE OPERATION

(71) Applicant: Nokia Technologies Oy, Espoo (FI)

(72) Inventors: Andreas Maeder, Würzburg (DE); Nitin Mangalvedhe, Hoffman Estates, IL (US); Rapeepat Ratasuk, Inverness, IL (US); Mikhail Vilgelm, Munich (DE); Murat Guersu, Munich (DE); Wolfgang Kellerer, Fürstenfeldbruck (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/596,801

(22) Filed: Oct. 9, 2019

(65) Prior Publication Data

US 2021/0112389 A1 Apr. 15, 2021

(51) Int. Cl.
*H04L 12/26* (2006.01)
*H04W 4/50* (2018.01)
(Continued)

(52) U.S. Cl.
CPC .............. *H04W 4/50* (2018.02); *H04W 48/16* (2013.01); *H04W 72/0446* (2013.01);
(Continued)

(58) Field of Classification Search
CPC .............. H04W 4/00; H04W 28/0268; H04W 28/0289; H04W 4/50; H04W 12/06; H04W 12/0609; H04W 12/08; H04W 12/0804; H04W 4/14; H04W 4/16; H04W 4/21; H04W 76/10; H04W 88/16; H04W 8/18; H04W 4/02; H04W 4/021; H04W 4/029;
(Continued)

(56) References Cited

U.S. PATENT DOCUMENTS 5,721,583 A * 2/1998 Harada ............... H04N 7/17354
  348/E7.075
8,077,717 B2 * 12/2011 Yan ......................... H04L 12/18
  370/390

(Continued)

OTHER PUBLICATIONS

Laya et al., "Is the Random Access Channel of LTE and LTE-A Suitable for M2M Communications? A Survey of Alternatives", IEEE Communications Surveys & Tutorials, vol. 16, No. 1, 2014, pp. 4-16.

(Continued)

*Primary Examiner* — Phuc H Tran
(74) *Attorney, Agent, or Firm* — Squire Patton Boggs (US) LLP

(57) ABSTRACT

In accordance with example embodiments of the invention there is at least a method and apparatus to perform identifying, by a network node of a communication network, information from at least one network device of the communication network, wherein the information comprises a number of service requests for data communication by the at least one network device and an indication of an identifier identifying a purpose for each data communication mapped to each of the number of service requests; and based on the identifying, granting at least one service request of the number of service requests for the communicating.

11 Claims, 8 Drawing Sheets

(51) Int. Cl.
*H04W 48/16* (2009.01)
*H04W 76/30* (2018.01)
*H04W 72/04* (2009.01)
*H04W 72/14* (2009.01)
*H04W 76/11* (2018.01)

(52) U.S. Cl.
CPC ............ *H04W 72/14* (2013.01); *H04W 76/11* (2018.02); *H04W 76/30* (2018.02)

(58) Field of Classification Search
CPC ......... H04W 4/90; H04W 76/14; H04W 4/06; H04W 16/14; H04W 28/16; H04W 4/023; H04W 4/025; H04W 72/005; H04W 72/04; H04W 72/08; H04W 74/0808; H04W 28/18; H04W 48/12; H04W 64/003; H04W 72/1226; H04W 72/1268; H04W 72/1284; H04W 72/14; H04L 63/0876; H04L 12/66; H04L 51/32; H04L 63/0281; H04L 63/083; H04L 63/102; H04L 65/102; H04L 65/1073; H04L 67/10; H04L 67/303; H04L 67/306; H04L 65/1059; H04L 65/1069; H04L 65/1096; H04L 65/403; H04L 67/18; H04L 67/26; H04L 63/08; H04L 63/10; H04L 65/4076; H04L 67/12; H04L 67/2852; H04L 12/18; H04L 2029/06054; H04L 47/2491; H04L 47/6215; H04L 63/0815; H04L 63/0861; H04L 65/1016; H04L 65/604; H04L 67/1002; H04L 67/1008; H04L 67/101; H04L 67/1021; H04L 67/2814; H04L 67/2842; H04L 67/288; H04L 67/32; H04L 67/322; H04L 69/329; H04L 9/0869

See application file for complete search history.

(56) References Cited

U.S. PATENT DOCUMENTS

| | | | |
|---|---|---|---|
| 9,060,297 | B1 | 6/2015 | Reeves et al. |
| 9,420,634 | B2 | 8/2016 | Sajadieh et al. |
| 9,439,062 | B2 | 9/2016 | Li et al. |
| 2013/0166623 | A1* | 6/2013 | Stanwood ............... H04W 4/00 709/202 |
| 2016/0212653 | A1* | 7/2016 | Wang ................ H04W 28/0289 |
| 2019/0235478 | A1* | 8/2019 | Nakamoto .......... G06F 16/2365 |

OTHER PUBLICATIONS

Mayorga et al., "Performance Analysis of Access Class Barring for Handling Massive M2M traffic in LTE-A Networks", IEEE International Conference on Communications (ICC), May 22-27, 2016, 6 pages.

Ansari et al., "SAI: Safety Application Identifier Algorithm at MAC Layer for Vehicular Safety Message Dissemination Over LTE VANET Networks", Wireless Communications and Mobile Computing, vol. 2018, 2018, pp. 1-17.

"3rd Generation Partnership Project; Technical Specification Group Services and System Aspects; Procedures for the 5G System; Stage 2 (Release 16)", 3GPP TS 23.502, V16.1.1, Jun. 2019, pp. 1-495.

"3rd Generation Partnership Project; Technical Specification Group Radio Access Network; NR; Radio Resource Control (RRC) protocol specification (Release 15)", 3GPP TS 38.331, V15.5.1, Apr. 2019, pp. 1-491.

Lin et al., "The Roles of 5G Mobile Broadband in the Development of IoT, Big Data, Cloud and SDN", Communications and Network, vol. 8, No. 1, 2016, pp. 9-21.

* cited by examiner

| SP-ID rule 310 | Type (8 bits) 320 | Rule (16 bits) 330 |
|---|---|---|
| 00010001 | Deterministic Sch. | Schedule 1 out of many within 100 ms |
| 00010011 | Deterministic Sch. | Schedule 3 out of many within 1 s |
| 00010010 | Stochastic Sch. | Schedule %10 of active devices within 10 ms |
| 00010111 | Stochastic Sch. | Schedule %100 of active devices within 10 s |

FIG. 3A

SchedulingRequestConfig information element

```
-- ASN1START
-- TAG-SCHEDULINGREQUESTCONFIG-START

SchedulingRequestConfig ::=         SEQUENCE {
    schedulingRequestToAddModList   SEQUENCE (SIZE (1..maxNrofSR-ConfigPerCellGroup)) OF
SchedulingRequestToAddMod OPTIONAL, -- Need N
    schedulingRequestToReleaseList  SEQUENCE (SIZE (1..maxNrofSR-ConfigPerCellGroup)) OF
SchedulingRequestId OPTIONAL -- Need N
}

SchedulingRequestToAddMod ::=       SEQUENCE {
    schedulingRequestId     SchedulingRequestId, sr-singlepurposeId                  INTEGER (0..65535)
    sr-ProhibitTimer                ENUMERATED {ms1, ms2, ms4, ms8, ms16, ms32, ms64,
ms128}          OPTIONAL, -- Need S
    sr-TransMax                     ENUMERATED { n4, n8, n16, n32, n64, spare3, spare2,
spare1}
}

-- TAG-SCHEDULINGREQUESTCONFIG-STOP
-- ASN1STOP
```

FIG. 3B

610: identifying, by a network node of a communication network, information from at least one network device of the communication network, wherein the information comprises a number of service requests for data communication by the at least one network device and an indication of an identifier identifying a purpose for each data communication mapped to each of the number of service requests 620: based on the identifying, granting at least one service request of the number of service requests for the communicating

FIG. 6A

650: determining, by a network device of at least one network device of a communication network, an identifier mapped to a service request for a data communication by the network device, wherein the identifier is identifying a purpose for the data communication by the network device 660: communicating, by the network device, with a network node associated with the communication network, information comprising the service request and an indication of the identifier for the data communication by the network device

FIG. 6B

ACCESS MECHANISM FOR SINGLE PURPOSE OPERATION

TECHNICAL FIELD

The teachings in accordance with the exemplary embodiments of this invention relate generally to smart filtering of a transmission with a radio access and, more specifically, relate to smart filtering of a transmission with a radio access that is based on smart filtering using a semantic meaning of the information to be transmitted.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
5GS 5G System
AMF access and mobility management function
APP application
BS base station
BSR buffer status report
C-RNTI cell radio network temporary identifier
UE user equipment
ID identification
IE information element
IoT Internet of Things
LTE long term evolution
MAC medium access control
NEF network exposure function
NG next generation
NGS next generation system
SMF session management function
SP single purpose
SP-ID single purpose identification
SP-GRANT single purpose grant
SP-RNTI single purpose radio network temporary identifier
RNTI radio network temporary identifier
UCI uplink control information The wireless communications network technology implementations, such as set forth in 3GPP, have increased greatly over the years. Such implementation such as Long-Term Evolution (LTE) system technologies, also known as a 4G system, offer increased peak data rates, low latency, increased system capacity, and low operating costs.

At the time of this application 3GPP implementations are working to define requirements of a next generation system technologies including 5G. These next generation systems include next generation (NG) system (NGS) or 5G system (5GS).

However, with these next generation system technologies current connectivity solutions may not be supported or may not provide at a desired level of speed or customization for efficient operation. Thus, improvements in wireless communication operations for these implementations is seen to be needed.

Example embodiments of the invention work to address at least these issues.

SUMMARY

This section contains examples of possible implementations and is not meant to be limiting.

In an example aspect of the invention, there is a method, comprising: identifying, by a network node of a communication network, information from at least one network device of the communication network, wherein the information comprises a number of service requests for data communication by the at least one network device and an indication of an identifier identifying a purpose for each data communication mapped to each of the number of service requests; and based on the identifying, granting at least one service request of the number of service requests for the communicating.

A further example embodiment is a method comprising the method of the previous paragraph, wherein the number of service requests comprises more than one service request mapped to a same identifier, and wherein the at least one service request mapped to the same identifier is determined to be associated with more than one data communication having at least one of a same data content or a same purpose, wherein the number of service requests comprises more than one service request received during a time window, and wherein the more than one service request received during the time window is determined as being associated with more than one data communication having at least one of a same data content or a same purpose, wherein the time window is started upon a reception of a first service request of the more than one service request, wherein the granted at least one service request comprises at least one service request received during a maximum time period of the time window that is started when a first service request with the indication of the identifier is received, and wherein remaining service requests of the more than one service request based on the time window are not granted, wherein the granted at least one service request is for a subset of network devices of the at least one network device to perform the data communication, and wherein a number of network devices of the subset to be granted service requests is limited by a configuration at the network node, wherein the configuration of the limit of the number of network devices of the subset to be granted service requests is adjustable by at least one of the network node and the communication network, wherein the network node is caused to drop the remaining service requests of the more than one service request that are not granted, wherein the at least one network device is caused to drop packets for the number of service requests that are not granted, wherein based on the granted at least one service request, there is: sending towards the at least one network device an indication of the granted at least one service request, wherein the indication comprises at least one type of radio network temporary identifier, wherein the type of radio network temporary identifier is indicative to each network device of the at least one network device whether or not its service request was granted; and performing the data communication for the granted at least one service request, wherein the indication of the granted at least one service request comprises at least one of a cell radio type of network temporary identifier scrambled grant indicating that an associated data communication is granted or a single purpose type of radio network temporary identifier scrambled grant indicating that an associated data communication can be released, wherein the identifier is unique to at least one of the network node or a cell of the communication network or the identifier is derived from a single purpose identification, and wherein the identifier is identifying a level of priority of the data communication, wherein based on a number of more than one service request received during a time window being associated with the more than one data communication having at least one of a same data content or a same purpose, a priority is set for the more than one service request, and/or wherein the information from the at least one network device is using uplink control information.

A non-transitory computer-readable medium storing program code, the program code executed by at least one processor to perform at least the method as described in the paragraphs above.

In an example aspect of the invention, there is an apparatus, comprising: at least one processor; and at least one memory including computer program code, where the at least one memory and the computer program code are configured, with the at least one processor, to cause the apparatus to at least: identify, by a network node of a communication network, information from at least one network device of the communication network, wherein the information comprises a number of service requests for data communication by the at least one network device and an indication of an identifier identifying a purpose for each data communication mapped to each of the number of service requests; and based on the identifying, grant at least one service request of the number of service requests for the communicating.

A further example embodiment is an apparatus comprising the apparatus of the previous paragraphs, wherein the number of service requests comprises more than one service request mapped to a same identifier, and wherein the at least one service request mapped to the same identifier is determined to be associated with more than one data communication having at least one of a same data content or a same purpose, wherein the number of service requests comprises more than one service request received during a time window, and wherein the more than one service request received during the time window is determined as being associated with more than one data communication having at least one of a same data content or a same purpose, wherein the time window is started upon a reception of a first service request of the more than one service request, wherein the granted at least one service request comprises at least one service request received during a maximum time period of the time window that is started when a first service request with the indication of the identifier is received, and wherein remaining service requests of the more than one service request based on the time window are not granted, wherein the granted at least one service request is for a subset of network devices of the at least one network device to perform the data communication, and wherein a number of network devices of the subset to be granted service requests is limited by a configuration at the network node, wherein the configuration of the limit of the number of network devices of the subset to be granted service requests is adjustable by at least one of the network node and the communication network, wherein the network node is caused to drop the remaining service requests of the more than one service request that are not granted, wherein the at least one network device is caused to drop packets for the number of service requests that are not granted, wherein based on the granted at least one service request, the at least one memory including the computer program code is configured with the at least one processor to cause the apparatus to: send towards the at least one network device an indication of the granted at least one service request, wherein the indication comprises at least one type of radio network temporary identifier, wherein the type of radio network temporary identifier is indicative to each network device of the at least one network device whether or not its service request was granted; and perform the data communication for the granted at least one service request, wherein the indication of the granted at least one service request comprises at least one of a cell radio type of network temporary identifier scrambled grant indicating that an associated data communication is granted or a single purpose type of radio network temporary identifier scrambled grant indicating that an associated data communication can be released, wherein the identifier is unique to at least one of the network node or a cell of the communication network or the identifier is derived from a single purpose identification, and wherein the identifier is identifying a level of priority of the data communication, wherein based on a number of more than one service request received during a time window being associated with the more than one data communication having at least one of a same data content or a same purpose, a priority is set for the more than one service request, and/or wherein the information from the at least one network device is using uplink control information.

In another example aspect of the invention, there is an apparatus, comprising: means for identifying, by a network node of a communication network, information from at least one network device of the communication network, wherein the information comprises a number of service requests for data communication by the at least one network device and an indication of an identifier identifying a purpose for each data communication mapped to each of the number of service requests; and means, based on the identifying, for granting at least one service request of the number of service requests for the communicating.

In still another example aspect of the invention, there is a method, comprising: determining, by a network device of at least one network device of a communication network, an identifier mapped to a service request for a data communication by the network device, wherein the identifier is identifying a purpose for the data communication by the network device; and communicating, by the network device, with a network node associated with the communication network, information comprising the service request and an indication of the identifier for the data communication by the network device.

A further example embodiment is a method comprising the method of the previous paragraph, wherein the service request comprises a scheduling request configuration, wherein the service request is communicated with the network node using a time window during which more than one service request is communicated with the network node, wherein based on the service request being a first service request, the time window is started upon a reception of the first service request, wherein based on the time window, the service request is granted, wherein the granted at least one service request comprises at least one service request received during a maximum time period of the time window that is started when a first service request with the indication of the identifier is received, and remaining service requests of the more than one service request based on the time window are not granted, wherein based on the granted at least one service request, there is: receiving an indication of the granted at least one service request, wherein the indication comprises at least one type of radio network temporary identifier, wherein the type of radio network temporary identifier is indicative to each network device of the at least one network device whether or not its service request was granted, and where the data communication for the network device is performed by the network node, wherein the indication of the granted at least one service request comprises at least one of a cell radio type of network temporary identifier scrambled grant indicating that an associated data communication is granted or a single purpose type of radio network temporary identifier scrambled grant indicating that an associated data communication can be released, wherein the identifier is unique to at least one of the network node or a cell of the communication network or the identifier is derived from a single purpose identification, and wherein the identifier is identifying a level of priority of the data communication, and/or wherein the information is communicated using uplink control information.

A non-transitory computer-readable medium storing program code, the program code executed by at least one processor to perform at least the method as described in the paragraphs above.

In yet another example aspect of the invention, there is an apparatus, comprising: at least one processor; and at least one memory including computer program code, where the at least one memory and the computer program code are configured, with the at least one processor, to cause the apparatus to at least: determine, by a network device of at least one network device of a communication network, an identifier mapped to a service request for a data communication by the network device, wherein the identifier is identifying a purpose for the data communication by the network device; and communicate, by the network device, with a network node associated with the communication network, information comprising the service request and an indication of the identifier for the data communication by the network device.

A further example embodiment is an apparatus comprising the apparatus of the previous paragraphs, wherein the service request comprises a scheduling request configuration, wherein the service request is communicated with the network node using a time window during which more than one service request is communicated with the network node, wherein based on the service request being a first service request, the time window is started upon a reception of the first service request, wherein based on the time window the service request is granted, wherein the granted at least one service request comprises at least one service request received during a maximum time period of the time window that is started when a first service request with the indication of the identifier is received, and remaining service requests of the more than one service request based on the time window are not granted, wherein based on the granted at least one service request, the at least one memory including the computer program code is configured with the at least one processor to cause the apparatus to: receive an indication of the granted at least one service request, wherein the indication comprises at least one type of radio network temporary identifier, wherein the type of radio network temporary identifier is indicative to each network device of the at least one network device whether or not its service request was granted, and where the data communication for the network device is performed by the network node, wherein the indication of the granted at least one service request comprises at least one of a cell radio type of network temporary identifier scrambled grant indicating that an associated data communication is granted or a single purpose type of radio network temporary identifier scrambled grant indicating that an associated data communication can be released, wherein the identifier is unique to at least one of the network node or a cell of the communication network or the identifier is derived from a single purpose identification, and wherein the identifier is identifying a level of priority of the data communication, and/or wherein the information is communicated using uplink control information.

In another example aspect of the invention, there is an apparatus, comprising: means for determining, by a network device of at least one network device of a communication network, an identifier mapped to a service request for a data communication by the network device, wherein the identifier is identifying a purpose for the data communication by the network device; and means for communicating, by the network device, with a network node associated with the communication network, information comprising the service request and an indication of the identifier for the data communication by the network device.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 3A shows a table SP-ID scheduling rules for operations in accordance with example embodiments of the invention;

FIG. 3B shows a SchedulingRequestConfig information element for operations in accordance with example embodiments of the invention;

FIG. 6A and FIG. 6B each shows a method in accordance with example embodiments of the invention which may be performed by an apparatus.

DETAILED DESCRIPTION

Figure 1:
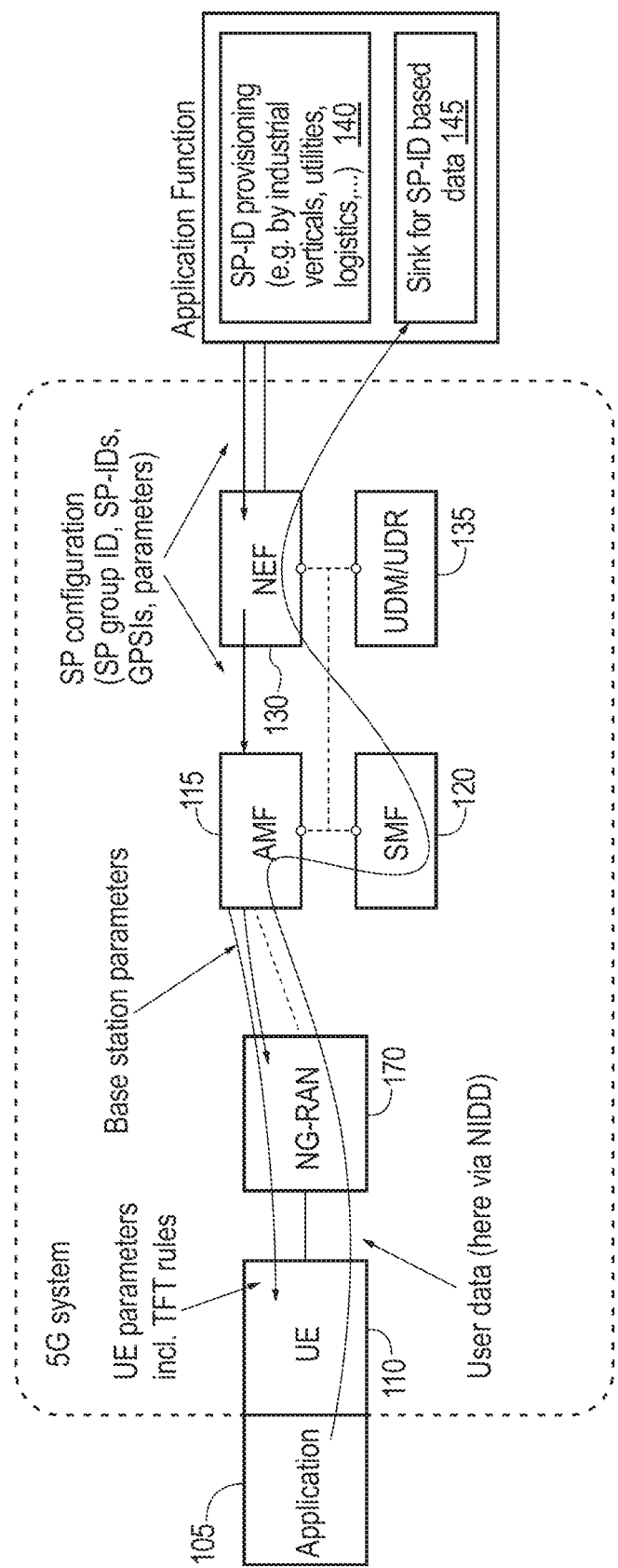
FIG. 1 shows SP-ID system architecture wherein operations in accordance with example embodiments of the invention can be formed.

In this invention, there is proposed at least a method and apparatus to perform smart filtering of a transmission with a radio access that is based on smart filtering using a semantic meaning of the information to be transmitted.

Internet of Things (IoT) is envisioned focal point of Release 16 of these next generation system technologies that is enabling connectivity between a multiple of devices. IoT has wide applications in various scenarios, including smart cities, smart environment, smart agriculture, and smart health systems.

Industrial IoT devices have different activation times so they cannot stay connected. This means that they require to gain access every time they have a message to send. The sheer multiplicity of the IoT devices disturbs the access mechanism in LTE, resulting in higher delays and inefficient use of system resources.

One of the reasons that there are a vast number of sensors that are reporting in synchronism is that they are reporting the same event. This approach guarantees that at least one of the report is transferred, however, as the system is overloaded, the transfer is unnecessarily delayed. The access class barring solution is suggested as a solution for different classes of traffic. The access barring parameter "a" is set by a base station such as an eNodeB or a gNB to be between values of 0 to 1. Then only a parameter "a" percentage of the devices from one class is allowed in the network. However, the class definition is too broad to guarantee any quality in terms of an application. It is merely used for prioritization purposes.

In an example embodiment of the invention there is proposed a single purpose identifier, SPID, where application level behavior can be guaranteed.

In an Industrial IoT environment, a high number of sensors communicate in a wireless manner with a base station. Certain events may cause the same message or content to be reported by a set of sensors at the same time, for example alarms, intrusion, certain periodic task fulfilment. Reporting the same event by all sensors in an uncoordinated manner may cause an unnecessarily high resource consumption (sudden burst), that may delay other traffic or in the worst case that may delay the message delivery itself. In this way it is beneficial to coordinate the UE message sending to avoid negative effects of same information bursts without affecting the overall system functionality. The simultaneous requests can affect 3 different part of the network 1) random access channel 2) uplink control channel 3) uplink data channel.

In case the sensors serve the same purpose, each transmit grant requests on the uplink control channel separately or use the random access channel for the same purpose if they are in idle state. This causes unnecessary use of control channel resources. Following, if the BS grants UL resources for all of the requests it will be wasting the UL data channel resources.

On the other side of the story, if a set of UEs is placed in close vicinity to report the same event, e.g., "smoke detection", they are expected to use the same network at the same time. The network performance is degraded when they work in synchronism and would delay UEs access time. Clearly, this is counter-productive.

In short, multiple UEs that serve a single purpose, that the BS is unaware of, results in unwanted consequences such as reduced resource efficiency for the BS and increased delay for the UE.

In one proposal access class barring is suggested to bar access of UEs from the same class. This provided that in case class of UEs that report in synchronism is not a high priority class, they can be barred and the access of the other UEs is unaffected. However, this did not solve the problem for access of the barred class.

The recognition of the application layer is introduced in another proposal as a layer 2 header. The purpose is unclear and probably specified only for 3G. This kind of layer 2 header can be integrated to enable SPID signalling.

Further, eSIM has been proposed that enables a virtual UE inside a UE through an eSIM id. This can be used to replace the SPID with an eSIM id. However, using different eSIMs for each application is quite overburdening for the eNodeB and also for the UE. The similar idea of a Virtual UE has also been proposed.

A vehicular safety application based identifier, SAI, is introduced in SAI that will be in the unused 16-bit long MAC Control Element inside the BSR. BSR is a vehicular based MAC message in LTE. The identifier is used in MAC layer to simplify an already existing process related to cars that also use location of the cars as part of a MAC layer broadcast. This is a good example how a generic application based capability is required for many applications.

An APP-layer MAC coordination has been proposed through an Application layer agent present in the UE and in the BS. APP-layer agent is designed to be an entity that can be reached with IP for settings and attachment. The aim was multimedia streaming and mostly the downlink coordination is covered, and how the uplink coordination after the requests are received is not clarified.

In view of at least these proposals, example embodiments of this invention provide at least a method and apparatus for smart filtering of transmission in the radio access based on the semantic meaning of the information to be transmitted.

One purpose in accordance with example embodiments of the invention is to avoid congestion in the radio originating from massive transmission attempts, e.g., in case of an alarm in an industrial or massive IoT scenario (examples are smart city, fire alarms in rural or urban scenarios, highly redundant sensors in industrial environments, etc.)

In an example embodiment of the invention there is included:

A mapping between a semantic meaning (i.e., "purpose") and an identifier is defined, which is denoted as Single-Purpose identifier (SP-ID) and is provisioned to the base stations and to the mobile terminals. This ID is more specific compared e.g. to Quality of Service Class definition in the sense that it carries semantic information—the purpose—indicating the content type, but not the content details of the information to be transmitted. An example for such a purpose could be "fire alarm in Munich, building 12";

In case of a transmission for which an SP-ID is defined, the mobile terminal encodes the scheduling request with said SP-ID;

It is assumed that many terminals send a scheduling request encoded with the same SP-ID approximately at the same time instance. This time interval is a parameter and denoted as spidTimeMax;

The base station will grant, according to a scheduling rule, several scheduling requests such that a subset of mobile terminals can transmit user data (e.g., such as more detailed information on the alarm). The scheduling rules include the maximum number of to be granted scheduling requests (denoted as N_spid_max), as well as schemes for selecting the scheduling request for granting within the time interval;

The base station will indicate to the other mobile terminals that no re-transmission attempt should be tried within the configured time range; and/or The user data is sent to the customer (e.g., a utility), and is on its way further augmented with additional network-level information such as the location of the mobile terminals or the number of scheduling requests.

FIG. 1 illustrates operations in accordance with an example embodiment of the invention of a system architecture for 5GS for the case that Non-IP Data Delivery (NIDD) is used.

As shown in FIG. 1 there is communicated using an application layer 105 of the UE 110 a session request with the NG-RAN 170 for user data. The session request with the NG-RAN 170 is also using an AMF (access and mobility management function) 115 and/or an SMF (session management function) 120 to augment in accordance with example embodiments of the invention the session request for the user data. In addition, for the communication there is an NEF (Network Exposure Function) 130 and a UDM/UDR (unified data management/user data repository) 135.

As a note, the NEF may be external to the UE 110 or external to a device of the NG-RAN 170 that is processing the session request. The processing can include, as shown in steps 140 of FIG. 1 SP-ID provisioning (e.g., by industrial verticals, utilities, logistics, . . . etc.) and/or as shown in step 145 of FIG. 1 a sink for SP-ID based data.

Operations in accordance with example embodiments of the invention as may be associated with FIG. 1 can include:

An external entity (e.g., a vertical utility, logistics, or any other enterprise or entity) provides for a set of mobile terminals (e.g., sensors) with SP-IDs, mapping rules, and parameters to Network Exposure Function (NEF). NEF further distributes these parameters into 5GS and RAN.

An SP-ID is mapped to a specific semantic information and therefore has a single purpose, which is to indicate that some information for this purpose needs to be transmitted by a mobile terminal. Examples are alarms of any kind which is raised by many sensors, e.g. in a geographic area, which is known to contain the same or very similar information due to redundancy (e.g., fire, gas leakage, traffic, malfunction with multiple redundant sensors, . . . );

By receiving a scheduling request or initial access request marked with an SP-ID, RAN will grant only a few of the transmissions to collect the additional information content, and will deny the rest;

RAN forwards the received user data together with the number of requests per SP-ID to the application function (e.g. using NIDD);

AMF may further augment the data by adding network information such as UE position (cell ID, location information when available) and other data; and AF receives user data along with augmentation data.

Figure 2:
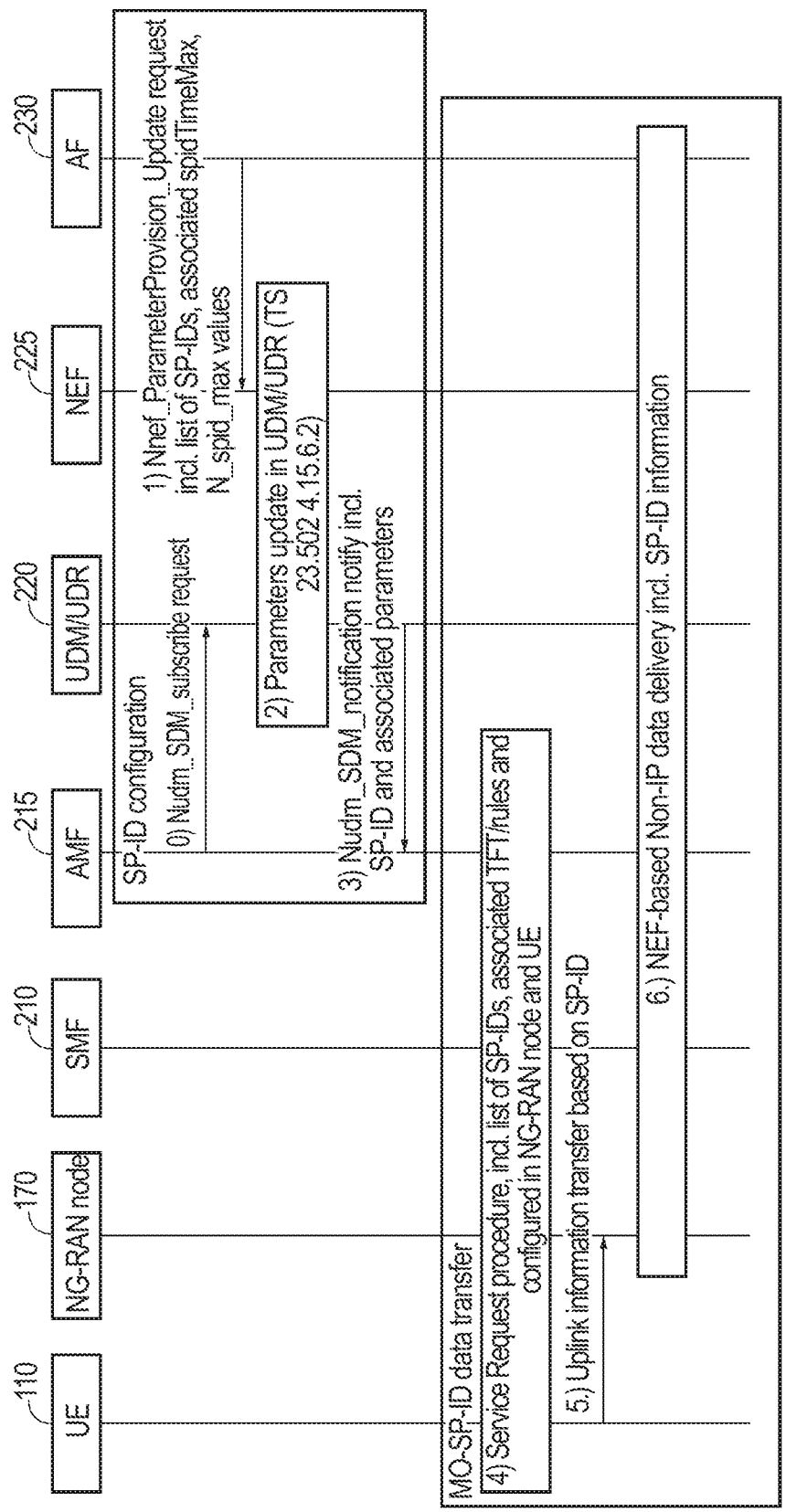
FIG. 2 shows an SP-ID configuration procedure in accordance with example embodiments of the invention which configures SP-ID and associated parameters in 5GC.
Figure 4:
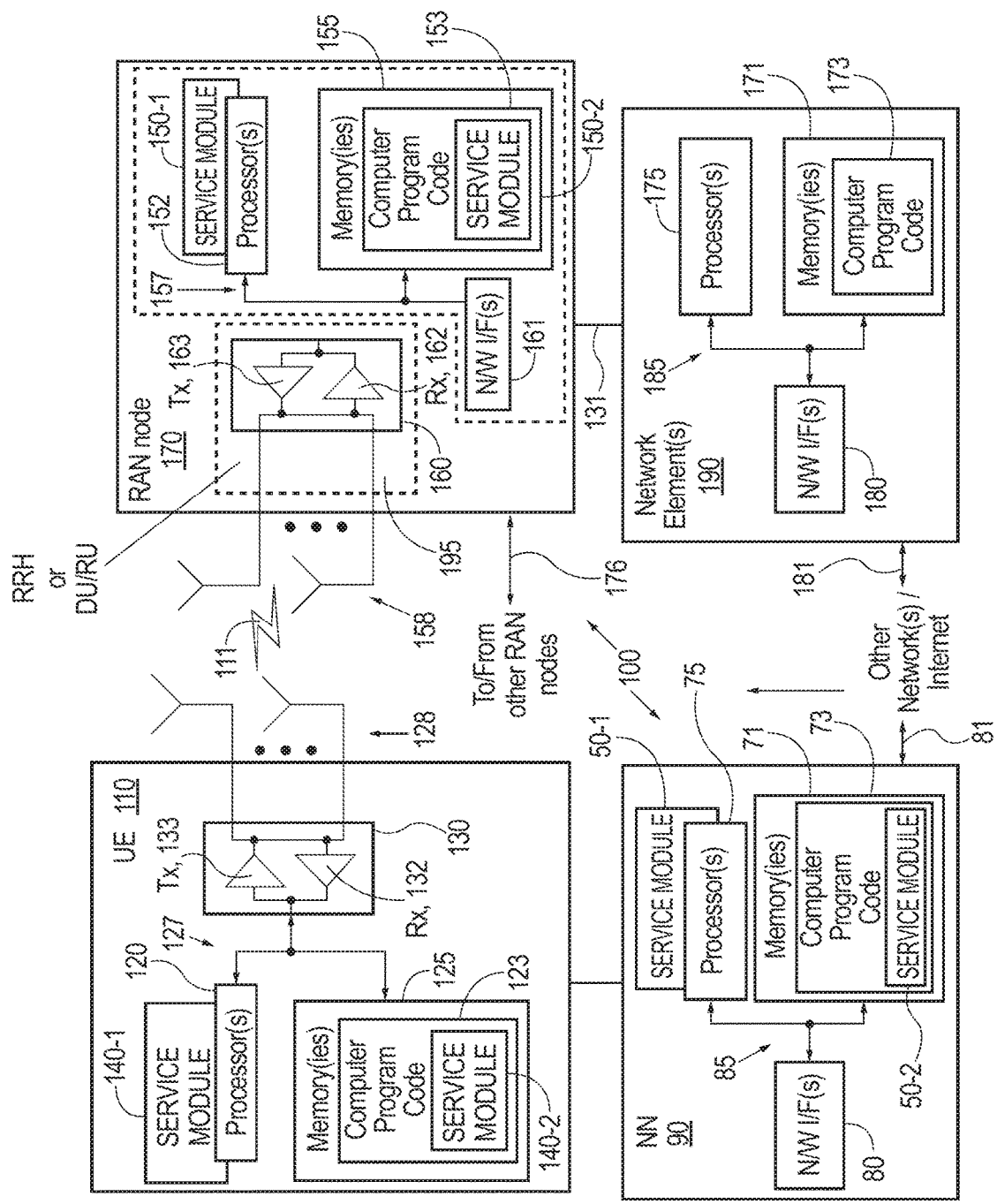
FIG. 4 shows a high level block diagram of various devices used in carrying out various aspects of the invention.

FIG. 2 shows an SP-ID configuration procedure in accordance with example embodiments of the invention which configures SP-ID and associated parameters in 5GC. In FIG. 2 there is shown communications between devices including a UE 110, NG-RAN Node 170, SMF 210, AMF 215, UDM/UDR 220, NEF 225, and AF 230, as may be part of the wireless network 100 as shown in FIG. 4 as described below.

This SP-ID configuration as shown in FIG. 2 shows configuring SP-ID and associated parameters in 5GC in accordance with example embodiments of the invention. FIG. 2 is described below with reference to the step numbers as shown in FIG. 2.

In Steps 0) to 3) of FIG. 2 there is included steps, as may be defined in 3GPP TS 23.502 section 4.15.6.2, with the following parameters provided by the AF 230:

GPSI for identifying UE;
Transaction ID;
List of SP-IDs per UE;
Values for spidTimeMax, N_spid_max; and
UE filter rules to map application data to SP-ID
Mobile-Originated SP-ID Based Data Transfer:

In step 4) of FIG. 2, in service request procedures as may be defined in TS 23.502 section 4.2.3, the AMF 215 provides List of SP-IDs and spidTimeMax, N_spid_max, to NG-RAN node 170, and UE 110 filter rules into RRC Reconnection reconfiguration included in a NAS message to UE 110.

Step 5) of FIG. 2 shows UE 110 and NG-RAN node 170 perform SP-ID based uplink information transfer as detailed herein;

Step 6) NEF-based Non-IP data delivery is used to transfer data to AF 230, including SP-ID. Data can be further augmented e.g. in AMF 215 by including location information (e.g. Global Cell ID) and other information.

Before describing the example embodiments of the invention in further detail, reference is made to FIG. 4 which shows a high level block diagram of various devices used in carrying out various aspects of the invention.

As shown in FIG. 4 there is a network node NN 110, that is for example a user equipment UE, radio access network (RAN) node 170, an NN 90, and network element(s) 190 are illustrated. In FIG. 4, the NN 110 is in wireless communication with a wireless network 100. A UE is a wireless, typically mobile device that can access a wireless network. The UE, for example, may be a mobile phone (or called a "cellular" phone) and/or a computer with a mobile terminal function. For example, the UE or mobile terminal may also be a portable, pocket, handheld, computer-embedded or vehicle-mounted mobile device and performs a language signaling and/or data exchange with the RAN.

The NN 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The NN 110 includes a Service module 140, comprising one of or both parts 140-1 and/or 140-2, which may be implemented in a number of ways. The Service module 140 can be configured to cause the NN 110 to perform operations in accordance with example embodiments of the invention as disclosed herein. The Service module 140 may be implemented in hardware as Service module 140-1, such as being implemented as part of the one or more processors 120. The Service module 140-1 may be implemented also as an integrated circuit or through other hardware such as a programmable gate array. In another example, the Service module 140 may be implemented as Service module 140-2, which is implemented as computer program code 123 and is executed by the one or more processors 120. For instance, the one or more memories 125 and the computer program code 123 may be configured, with the one or more processors 120, to cause the NN 110 to perform one or more of the operations as described herein. The NN 110 communicates with RAN node 170 and/or the NN 90 via a wireless link 111 and/or link 176 and/or link 81.

The RAN node 170 is a network node such as a base station that provides access by wireless devices such as the NN 110 to the wireless network 100. The RAN node 170 may be, for instance, a base station for 5G, also called New Radio (NR). In 5G, the RAN node 170 may be a NG-RAN node, which is defined as either a gNB or an ng-eNB. The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153.

The RAN node 170 includes a Service module 150, comprising one of or both parts 150-1 and/or 150-2, which may be implemented in a number of ways. The Service module 150 can be configured to cause the RAN node 170 to perform operations in accordance with example embodiments of the invention as disclosed herein. The Service module 150 may be implemented in hardware as Service module 150-1, such as being implemented as part of the one or more processors 152. The Service module 150-1 may be implemented also as an integrated circuit or through other hardware such as a programmable gate array. In another example, the Service module 150 may be implemented as Service module 150-2, which is implemented as computer program code 153 and is executed by the one or more processors 152. For instance, the one or more memories 155 and the computer program code 153 are configured, with the one or more processors 152, to cause the RAN node 170 to perform one or more of the operations as described herein.

Similarly the NN 90 is a network node, such as for example another user equipment or an access device such as a base station. The NN 90 includes one or more processors 75, one or more memories 71, one or more network interfaces (N/W I/F(s)) 80, and though not shown, it is noted that the (N/W I/F(s)) 80 of the NN 90 includes one or more transceivers interconnected through one or more buses 85. Further, the NN 90 has one or more transceivers each connected to an antenna and including a receiver, Rx, and a transmitter. The one or more transceivers of the NN 90 are connected to one or more antennas. For example, the one or more transceivers of the NN 90 may be implemented as a remote radio head (RRH). The one or more memories 71 include computer program code 73 and is executed by at least Processor(s) 75.

The NN 90 includes a Service module 50, comprising one of or both parts 50-1 and/or 50-2, which may be implemented in a number of ways. The Service module 50 can be configured to cause the NN 90 to perform operations in accordance with example embodiments of the invention as disclosed herein. The Service module 50 may be implemented in hardware as Service module 50-1, such as being implemented as part of the one or more processors 75. The Service module 50-1 may be implemented also as an integrated circuit or through other hardware such as a programmable gate array. In another example, the Service module 50 may be implemented as Service module 50-2, which is implemented as computer program code 73 and is executed by the one or more processors 75. For instance, the one or more memories 71 and the computer program code 73 are configured, with the one or more processors 75, to cause the NN 90 to perform one or more of the operations as described herein.

The one or more network interfaces N/W I/F(s) 161 and 80 can communicate over a network such as via the links 176 and/or 81. Two or more of RAN nodes, such as the RAN node 170 communicate and/or the NN 90 may be using, e.g., link 176 or 81. The link 176 may be wired or wireless or both and may implement, e.g., an Xn interface for 5G, an X2 interface for LTE, or other suitable interface for other standards.

The one or more buses such as the one or more buses 157 of RAN node 170 and/or the one or more buses of NN 90 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) such as the RRH 195 for LTE or for gNB implementation for 5G, with the other elements of the RAN node 170 possibly being physically in a different location from the RRH, and the one or more buses 157 could be implemented in part as, e.g., fiber optic cable or other suitable network connection to connect the other elements of the RAN node 170 or the NN 90 to an RRH such as the RRH 195.

In addition, the RAN node 170 may include a gNB node for providing NR user plane and control plane protocol terminations towards the UE, and connected via the NG interface to a 5GC (e.g., the network element(s) 190). In addition, the RAN node 170 may include an ng-eNB node for providing E-UTRA user plane and control plane protocol terminations towards the UE, and connected via the NG interface to the 5GC.

It is noted that description herein indicates that "cells" perform functions, but it should be clear that a base station that forms the cell will perform the functions. The cell makes up part of a base station. That is, there can be multiple cells per base station. For instance, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has more than one cell. It is further noted that a single cell may have multiple Transmission Reception Points (TRxPs or TRPs) that are used in order to form the cell.

The wireless network 100 may include a network element 190 or elements that may include core network functionality, and which provides connectivity via at least a link 181 or link 176 or link 131 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)).

Such core network functionality by the network element 190 may include a MME (Mobility Management Entity)/SGW (Serving Gateway) functionality for LTE and similar functionality for 5G. These are merely exemplary functions that may be supported by the network element(s) of the network 100, and note that both 5G and LTE functions might be supported. The RAN node 170 is coupled via a link 131 to a network element 190 and the NN 90 is connected via link 181 to the network element 190. The link 131 and/or link 181 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured, with the one or more processors 175, to cause the network element 190 to perform one or more operations, such as operations in accordance with example embodiments of the invention as described herein.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 and/or 75 and/or 175 and memories 155 and/or 71 and/or 171, and also such virtualized entities create technical effects.

The computer readable memories 125, 155, 171, and 71 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, 171, and 71 may be means for performing storage functions. The processors 120, 152, 175, and 75 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, 175, and 75 may be means for performing functions, such as controlling the NN 110, RAN node 170, NN 90, and other functions as described herein.

In general, the various embodiments of the NN 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances (including Internet of Things devices) permitting wireless Internet access and possibly browsing, tablets with wireless communication capabilities, as well as portable units or terminals that incorporate combinations of such functions.

Some RAN level procedures in accordance with example embodiments of the invention include:
 a RAN context of each SP-ID is associated with certain rules:
  For UE, these rules are realized by using TFTs:
   What TFT does is to filter packets into correspondent bearers according to packets' IP address, port number, protocol direction, priority,
   Mapping between application or service and SP-ID can be set using the priority field of TFT, preconfigured or it can be configured via signaling (e.g., NAS/N1 or RRC); and
  For the BS, these rules are provided by the core network:
   Base station derives a cell specific ID, SP-RNTI from SP-ID;
 For the UE, if there is traffic to be sent which is mapped to an SP-ID, the UE adds SP-ID (or a derived RAN level-identifier which may be unique per base station or cell, e.g. by combining with cell ID) to the scheduling/resource request:
  For RACH-based procedure, either:
   SP-ID (or derived RAN-level identifier) is added to msg3 or msg5 additionally to (Temporary) C-RNTI; or
   SP-RNTI derived from SP-ID is transmitted in msg3 instead of (Temporary) RNTI, where SP-RNTI is defined a subset of RNTI space; or
   mapped to a specific RACH pre-amble index range or PRACH resource range;
  For PUCCH-based procedure, UE sends SP-ID in a scheduling request (SR) in an uplink control information (UCI) e.g. by adding SP-ID to SchedulingRequestConfig as defined in TS 38.331;
  Note that if added to msg 3 or msg5 and for PUCCH-based procedure, gNB also receives (Temporary) C-RNTI and can therefore associate SP-ID to a UE;
 In the BS, a time window spidTimeMax is defined which denotes the time after reception of a first SP-ID until the reception of a next SP-ID is considered as belonging to the same transaction. The spidTimeMax can be set to an infinite value to allow large delay operation. It is up to the scheduler implementation how to handle reception of multiple SP-ID within spidTimeMax. Some options are:
  After reception of the first SP-ID, all additional requests are not granted;
  The first N_spid_max SP-ID requests are granted, where N_spid_max is a configurable parameter which can be used to adjust the reliability of the transmission. All other requests are dropped;
  Between SP-ID there is a prioritization rule that allows serving of some SP-IDs before others:
   In one case it may mean one SP-ID is prioritized over the other one
   In another scenario it may mean that UEs sharing the same SP-ID can be prioritized with a specific rule among themselves;
  These rules are called "SP-ID scheduling rules" and are further detailed herein
 BS indicates explicitly to UE that no further attempt should be tried:
  BS has received a scheduling request for an SP-ID;
  After a fixed amount of time has passed "spidTimeMax", some or all of the requests are granted resources with the same grant process as previously (C-RNTI scrambled grant directed for a specific UE);
  After "spidTimeMax", a special SP-RNTI scrambled acknowledgment is transmitted. The SP-RNTI scrambled acknowledgment is decoded by all UEs with the related SP-RNTI and in case a UE has received no C-RNTI based grant it deduces that another UE is granted resources and this UE reports a success to higher layers; and/or
  A UE that has not received either a C-RNTI scrambled resource grant or an SP-RNTI scrambled acknowledgment within a time "spidTimeMax" after its own request may deduce that the BS has failed to receive a request for this SP-ID and hence may attempt to send another request;
 In some cases, no UL scheduling is necessary if there is a binary mapping between an SP-ID and an event, such that an entity at the BS, can send a pre-set message to a pre-set IP address:
  In such a case the SP-RNTI scrambled grant is transmitted without any C-RNTI scrambled grant. All UEs with the same SP-RNTI are acknowledged:
   In one example, UEs are monitoring a grant using both C-RNTI and SP-RNTI. A grant scrambled by the SP-RNTI indicates that the data associated with the SP-RNTI can be released;
 I.e., the sole fact that UE(s) request resources with a given SP-ID allows a BS to infer that an event happened, and this information is sufficient, thus no further information is needed from UEs.

FIG. 3A shows a table SP-ID scheduling rules for operations in accordance with example embodiments of the invention. As shown in FIG. 3A the SP-ID scheduling rules include an SP-ID rule 310, a Type 320, and Rule (or 16 bits) 330.

With regards to FIG. 3A the SP-ID scheduling rule may be of two types either deterministic or stochastic. The deterministic cases represent the cases where a limited number of measurements is sufficient to fulfil the purpose. For instance if the aim is reporting a smoke event only the report from one of the sensors is sufficient to declare the event has occurred. A more cautious approach can prefer to receive at least 3 of the same reading incorporating the failure probability of the sensors.

The stochastic cases fit better to a distributed measurement purpose. For instance, if the aim of the sensors is to measure the temperature of a room, 10% of the readings can be sufficient. Even though the sensors are placed and ready, keeping them from transmitting saves their valuable energy, extending their lifetime.

Finally, if %100 of the active devices are scheduled, then this scenario maps to the current scheduled access. In this case the BS is unaware of the purpose of UEs.

For the access request scenario, the SP-RNTI is appended to the MSG 3 of the random access protocol of 5G/4G networks. The base-station accumulates the requests for a set of time spidTimeMax. After this time has passed, and this time has to be shorter than the ra-ContentionResolutionTimer, i.e., ra-ContentionResolutionTimer>spidTimeMax. spidTimeMax can also be zero.

For the PUCCH scenario, the SP-RNTI is already known by the base-station. UE sends SP-RNTI in a scheduling request (SR) in an uplink control information (UCI) e.g. by adding SP-RNTI "sr-singlepurposeId" to SchedulingRequestConfig as defined in TS 38.331. It is important that the SP-RNTI is added to the schedule request not the SP-ID, as SP-ID is not unique per cell but SP-RNTI is.

Further, in accordance with the example embodiments of the invention an IE SchedulingRequestConfig can be used to configure the parameters, for the dedicated scheduling request (SR) resources.

FIG. 3B shows how a SchedulingRequestConfig IE can be modified in accordance with example embodiments of the invention. This including that the BS later on proceeds to give a decision based on which UEs from the same SP-ID will be allocated resources, and grants resources to related UEs.

This is followed by an SP-RNTI based grant. The UEs who did not receive a C-RNTI specific grant prior to SP-RNTI grant drops their packets.

Figure 5A:
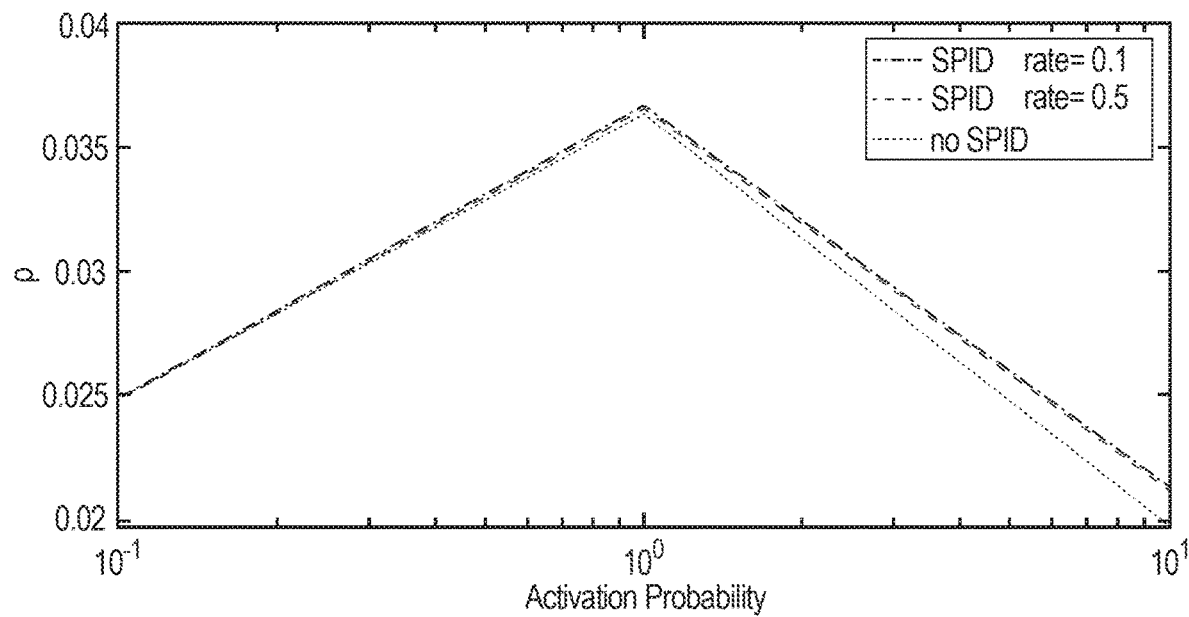
FIG. 5A and FIG. 5B each show Activation Probabilities in in accordance with example embodiments of the invention.
Figure 5B:
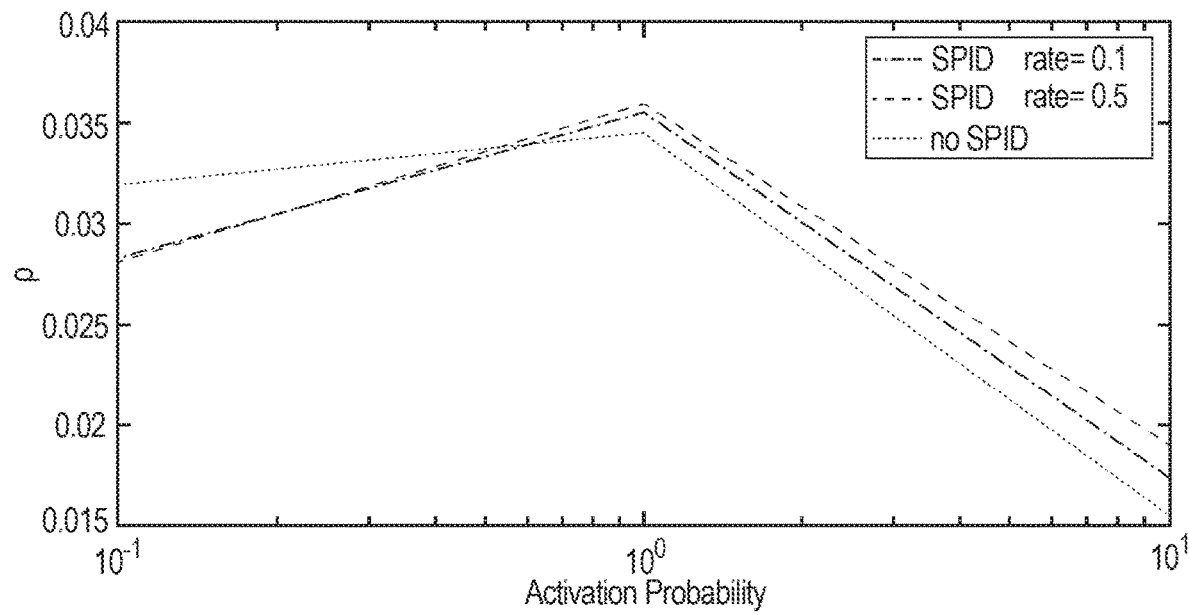

FIG. 5A and FIG. 5B each show Activation Probability(ies) as in accordance with example embodiments of the invention.

As shown in FIG. 5A and FIG. 5B there is shown an activation probability for SPID rates equal to 0.1 and 0.5, and an activation probability for no SPID.

Figure 5C:
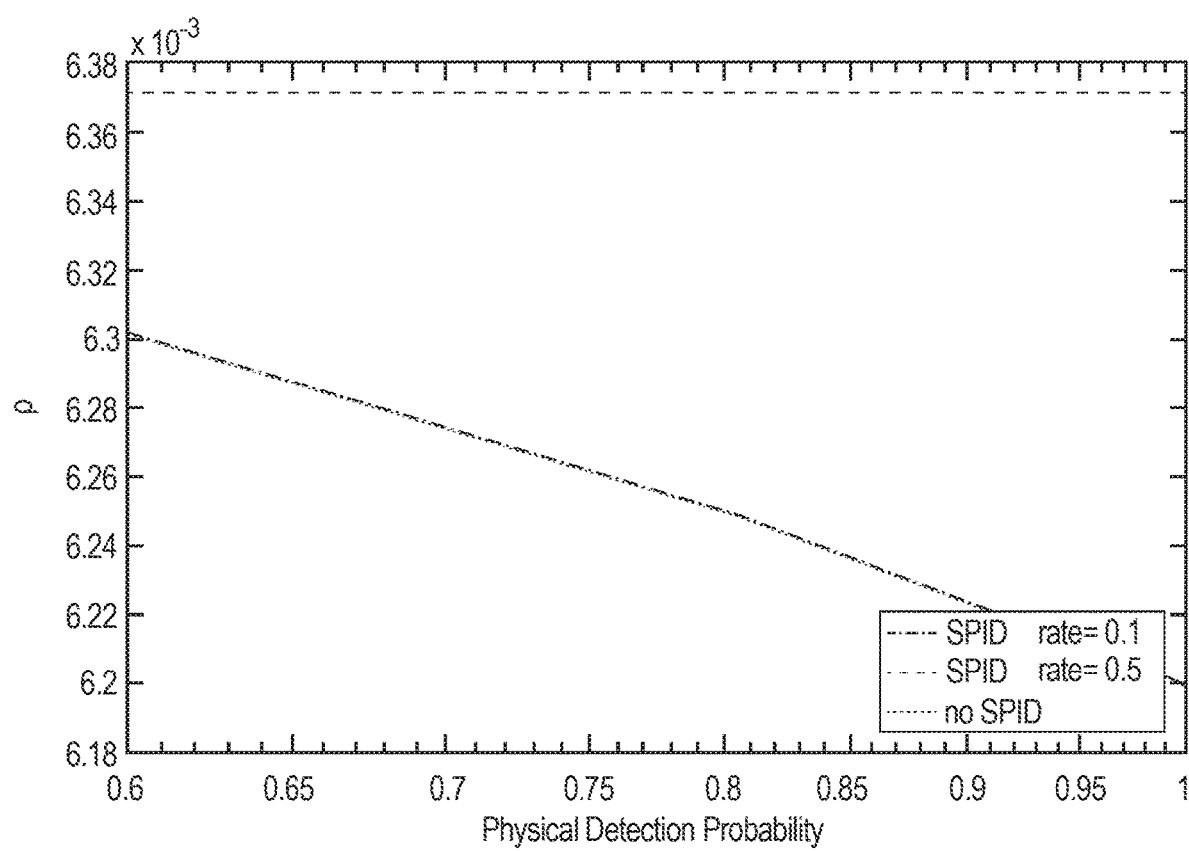
FIG. 5C and FIG. 5D each show Physical Detection Probabilities in in accordance with example embodiments of the invention.
Figure 5D:
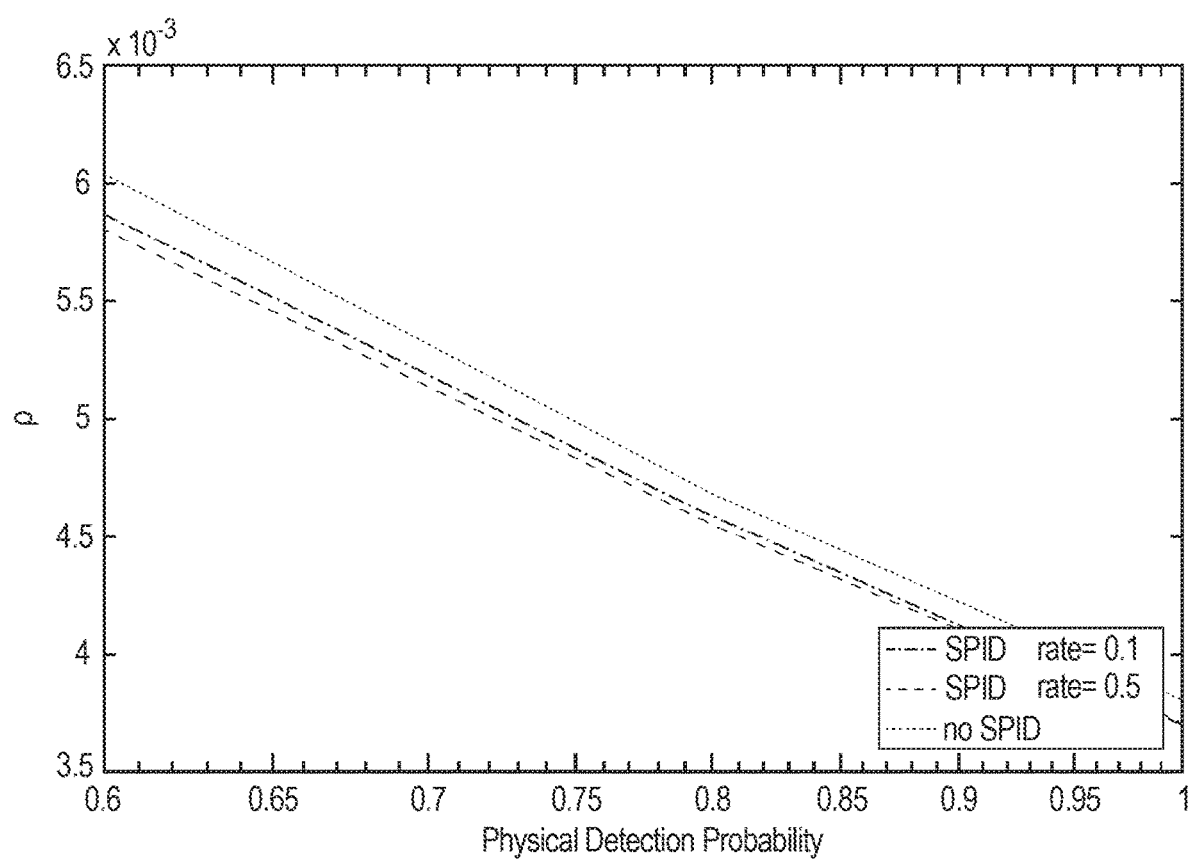

FIG. 5C and FIG. 5D each show Physical detection Probability(s) as in accordance with example embodiments of the invention;

FIG. 5C and FIG. 5D each show Physical detection probability(s) for SPID rates equal to 0.1 and 0.5, and an activation probability for no SPID.

FIG. 6A shows operations which may be performed by a device such as, but not limited to, a device associated with the RAN Node 170 as in FIG. 4. As shown in step 610 of FIG. 6A there is identifying, by a network node of a communication network, information from at least one network device of the communication network, wherein the information comprises a number of service requests for data communication by the at least one network device and an indication of an identifier identifying a purpose for each data communication mapped to each of the number of service requests. Then as shown in step 620 of FIG. 6A there is, based on the identifying, granting at least one service request of the number of service requests for the communicating In accordance with an example embodiment of the invention as described above in the paragraph above, wherein the number of service requests comprises more than one service request mapped to a same identifier, and wherein the at least one service request mapped to the same identifier is determined to be associated with more than one data communication having at least one of a same data content or a same purpose.

In accordance with an example embodiment of the invention as described above in the paragraphs above, wherein the number of service requests comprises more than one service request received during a time window, and wherein the more than one service request received during the time window is determined as being associated with more than one data communication having at least one of a same data content or a same purpose.

In accordance with an example embodiment of the invention as described above in the paragraphs above, wherein the time window is started upon a reception of a first service request of the more than one service request.

In accordance with an example embodiment of the invention as described above in the paragraphs above, wherein the granted at least one service request comprises at least one service request received during a maximum time period of the time window that is started when a first service request with the indication of the identifier is received, and wherein remaining service requests of the more than one service request based on the time window are not granted.

In accordance with an example embodiment of the invention as described above in the paragraphs above, wherein the granted at least one service request is for a subset of network devices of the at least one network device to perform the data communication, and wherein a number of network devices of the subset to be granted service requests is limited by a configuration at the network node.

In accordance with an example embodiment of the invention as described above in the paragraphs above, wherein the configuration of the limit of the number of network devices of the subset to be granted service requests is adjustable by at least one of the network node and the communication network.

In accordance with an example embodiment of the invention as described above in the paragraphs above, wherein the network node is caused to drop the remaining service requests of the more than one service request that are not granted.

In accordance with an example embodiment of the invention as described above in the paragraphs above, wherein the at least one network device is caused to drop packets for the number of service requests that are not granted.

In accordance with an example embodiment of the invention as described above in the paragraphs above, wherein based on the granted at least one service request, there is: sending towards the at least one network device an indication of the granted at least one service request, wherein the indication comprises at least one type of radio network temporary identifier, wherein the type of radio network temporary identifier is indicative to each network device of the at least one network device whether or not its service request was granted; and performing the data communication for the granted at least one service request.

In accordance with an example embodiment of the invention as described above in the paragraphs above, wherein the indication of the granted at least one service request comprises at least one of a cell radio type of network temporary identifier scrambled grant indicating that an associated data communication is granted or a single purpose type of radio network temporary identifier scrambled grant indicating that an associated data communication can be released.

In accordance with an example embodiment of the invention as described above in the paragraphs above, wherein the identifier is unique to at least one of the network node or a cell of the communication network or the identifier is derived from a single purpose identification, and wherein the identifier is identifying a level of priority of the data communication.

In accordance with an example embodiment of the invention as described above in the paragraphs above, wherein based on a number of more than one service request received during a time window being associated with the more than one data communication having at least one of a same data content or a same purpose, a priority is set for the more than one service request.

In accordance with an example embodiment of the invention as described above in the paragraphs above, wherein the information from the at least one network device is using uplink control information.

A non-transitory computer-readable medium (Memory(ies) 155 as in FIG. 4), encoded with program code (Computer Program Code 153 as in FIG. 4) executable by at least one processor (Processor(s) 152 and/or Service Module 150-1 and/or Service Module 150-2 as in FIG. 4) to perform the operations as at least described in the paragraphs above.

In accordance with an example embodiment of the invention as described above in the paragraphs above, there is means for identifying (e.g., one or more transceivers 160, Memory(ies) 155, Computer Program Code 153, and Processor(s) 152, Service module 150-1 and/or Service module 150-2 as in FIG. 4), by a network node (RAN node 170 as in FIG. 4) of a communication network (wireless network 100 as in FIG. 4), information from at least one network device (NN 110 and/or NN 90 as in FIG. 4.) of the communication network, wherein the information comprises a number of service requests for data communication by the at least one network device and an indication of an identifier identifying a purpose for each data communication mapped to each of the number of service requests. Then there is means, based on the identifying, for granting (e.g., one or more transceivers 160, Memory(ies) 155, Computer Program Code 153, and Processor(s) 152, Service module 150-1 and/or Service module 150-2 as in FIG. 4) at least one service request of the number of service requests for the communicating.

In the example aspect of the invention according to the paragraph above, wherein at least the means for identifying and granting comprises a transceiver [e.g., one or more transceivers 160 as in FIG. 4] a non-transitory computer readable medium [e.g., Memory(ies) 155 as in FIG. 4] encoded with a computer program [e.g., Computer Program Code 153 as in FIG. 4] executable by at least one processor [e.g., Processor(s) 152, Service module 150-1, and/or Service module 150-2 as in FIG. 4].

FIG. 6B illustrates operations which may be performed by a device such as, but not limited to, a device associated with NN UE 110 and/or a NN 90 as in FIG. 4. As shown in step 650 of FIG. 6B there is determining, by a network device of at least one network device of a communication network, an identifier mapped to a service request for a data communication by the network device, wherein the identifier is identifying a purpose for the data communication by the network device. Then as shown in step 660 of FIG. 6B there is communicating, by the network device, with a network node associated with the communication network, information comprising the service request and an indication of the identifier for the data communication by the network device.

In accordance with an example embodiment of the invention as described above in the paragraph above, wherein the service request comprises a scheduling request configuration.

In accordance with an example embodiment of the invention as described above in the paragraphs above, wherein the service request is communicated with the network node using a time window during which more than one service request is communicated with the network node.

In accordance with an example embodiment of the invention as described above in the paragraphs above, wherein based on the service request being a first service request, the time window is started upon a reception of the first service request.

In accordance with an example embodiment of the invention as described above in the paragraphs above, wherein based on the service request being the first service request of the more than one service request based on the time window, the first service request is granted and remaining service requests of the more than one service request based on the time window are not granted.

In accordance with an example embodiment of the invention as described above in the paragraphs above, wherein based on the granted at least one service request, there is receiving an indication of the granted at least one service request, wherein the indication comprises at least one type of radio network temporary identifier, wherein the type of radio network temporary identifier is indicative to each network device of the at least one network device whether or not its service request was granted, and wherein the data communication for the network device is performed by the network node.

In accordance with an example embodiment of the invention as described above in the paragraphs above, wherein the indication of the granted at least one service request comprises a single purpose radio network temporary identifier.

In accordance with an example embodiment of the invention as described above in the paragraphs above, wherein the identifier is unique to at least one of the network node or a cell of the communication network or the identifier is derived from a single purpose identification, and wherein the identifier is identifying a level of priority of the data communication.

In accordance with an example embodiment of the invention as described above in the paragraphs above, wherein the information is communicated using uplink control information.

A non-transitory computer-readable medium (Memory(ies) 125 and/or Memory(ies) 71 as in FIG. 4) storing program code (Computer Program Code 123 and/or Computer Program Code 73 as in FIG. 4), the program code executed by at least one processor (Processor(s) 120 and/or Processor(s) 75, service module 140-1 and/or service module 50-1, and/or service module 140-2 and/or service module 50-2 as in FIG. 4) to perform the operations as at least described in the paragraphs above.

In accordance with an example embodiment of the invention as described above in the paragraphs above, there is means for determining (one or more transceivers 130 and/or N/W I/F(s) 80, Memory(ies) 125 and/or Memory(ies) 71, Computer Program Code 123 and/or Computer Program Code 73, and Processor(s) 120 and/or Processor(s) 75, service module 140-1 and/or service module 50-1, and/or service module 140-2 and/or service module 50-2 as in FIG. 4), by a network device (NN 110 and/or NN 90 as in FIG. 4) of at least one network device of a communication network (wireless network 100 as in FIG. 4), an identifier mapped to a service request for a data communication by the network device, wherein the identifier is identifying a purpose for the data communication by the network device. Then as shown in step 660 of FIG. 6B there is communicating (Memory(ies) 125 and/or Memory(ies) 71, Computer Program Code 123 and/or Computer Program Code 73, and Processor(s) 120 and/or Processor(s) 75, service module 140-1 and/or service module 50-1, and/or service module 140-2 and/or service module 50-2 as in FIG. 4), by the network device, with a network node (RAN Node 170 as in FIG. 4) associated with the communication network, information comprising the service request and an indication of the identifier for the data communication by the network device.

In the example aspect of the invention according to the paragraph above, wherein at least the means for determining and communicating comprises a transceiver [e.g., one or more transceivers 130 and/or N/W I/F(s) 80 as in FIG. 4] a non-transitory computer readable medium [e.g., Memory(ies) 125 and/or Memory(ies) 71 as in FIG. 4] encoded with a computer program [e.g., Computer Program Code 123 and/or Computer Program Code 73 as in FIG. 4] executable by at least one processor [e.g., Processor(s) 120 and/or Processor(s) 75, service module 140-1 and/or service module 50-1, and/or service module 140-2 and/or service module 50-2 as in FIG. 4].

Advantages of operations in accordance with example embodiments of the invention include:
1) Access protocol congestion is relieved, as many UEs that have not sent their request is acknowledged if one UE from that group is able to transmit its request;
2) Fine-tuned performance guarantees based on not the radio performance but "Purpose Performance" can be achieved:
a. One example to this is vehicular communication, where the goal is vehicles in close proximity is aware of each other. So if multiple vehicles has detected an event due to heavy breaking, reporting only one from them is faster than repeating the same event from all of them;
3) Efficient use of system resources as scheduling all devices serving the same purpose is not necessary;
4) This can be an enabler of information centric networking, the SP-ID can map to a data ID. UL and DL optimization can be used to schedule resources to serve the same SP-ID with a multicast rather than a unicast. This can be relevant also for caching; and
5) Improving life-time of sensors in a dynamic manner keeping them non-reporting if the purpose they are serving is reached.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:
1. A method, comprising:
identifying, by a network node of a communication network, information from at least one network device of the communication network, wherein the information comprises a number of service requests for data communication by the at least one network device and an indication of an identifier identifying a purpose for each data communication mapped to each of the number of service requests; and
based on the identifying, granting at least one service request of the number of service requests for the communicating, wherein the number of service requests comprises more than one service request mapped to a same identifier, and wherein the at least one service request mapped to the same identifier is determined to be associated with more than one data communication having at least one of a same data content or a same purpose, wherein the number of service requests comprises more than one service request received during a time window, and wherein the more than one service request received during the time window is determined as being associated with more than one data communication having at least one of a same data content or a same purpose, wherein the time window is started upon a reception of a first service request of the more than one service request, and wherein the granted at least one service request comprises at least one service request received during a maximum time period of the time window that is started when a first service request with the indication of the identifier is received, and wherein remaining service requests of the more than one service request based on the time window are not granted.

2. The method of claim 1, wherein the granted at least one service request is for a subset of network devices of the at least one network device to perform the data communication, and wherein a number of network devices of the subset to be granted service requests is limited by a configuration at the network node.

3. The method of claim 2, wherein the configuration of the limit of the number of network devices of the subset to be granted service requests is adjustable by at least one of the network node and the communication network.

4. The method of claim 1, wherein based on the granted at least one service request, the method comprising:
    sending towards the at least one network device an indication of the granted at least one service request, wherein the indication comprises at least one type of radio network temporary identifier, wherein the type of radio network temporary identifier is indicative to each network device of the at least one network device whether or not its service request was granted; and
    performing the data communication for the granted at least one service request.

5. The method of claim 4, wherein the indication of the granted at least one service request comprises at least one of a cell radio type of network temporary identifier scrambled grant indicating that an associated data communication is granted or a single purpose type of radio network temporary identifier scrambled grant indicating that an associated data communication can be released.

6. An apparatus comprising:
    at least one processor; and
    at least one memory including computer program code, where the at least one memory and the computer program code are configured, with the at least one processor, to cause the apparatus to at least:
    identify, by a network node of a communication network, information from at least one network device of the communication network, wherein the information comprises a number of service requests for data communication by the at least one network device and an indication of an identifier identifying a purpose for each data communication mapped to each of the number of service requests; and based on the identifying, grant at least one service request of the number of service requests for the communicating, wherein the number of service requests comprises more than one service request mapped to a same identifier, and wherein the at least one service request mapped to the same identifier is determined to be associated with more than one data communication having at least one of a same data content or a same purpose, wherein the number of service requests comprises more than one service request received during a time window, and wherein the more than one service request received during the time window is determined as being associated with more than one data communication having at least one of a same data content or a same purpose, wherein the time window is started upon a reception of a first service request of the more than one service request, and wherein the granted at least one service request comprises at least one service request received during a maximum time period of the time window that is started when a first service request with the indication of the identifier is received, and wherein remaining service requests of the more than one service request based on the time window are not granted.

7. A method, comprising:
    determining, by a network device of at least one network device of a communication network, an identifier mapped to a service request for a data communication by the network device, wherein the identifier is identifying a purpose for the data communication by the network device; and
    communicating, by the network device, with a network node associated with the communication network, information comprising the service request and an indication of the identifier for the data communication by the network device,
    wherein the service request is communicated with the network node using a time window during which more than one service request is communicated with the network node; wherein based on the service request being a first service request, the time window is started upon a reception of the first service request; and wherein based on the time window, the service request is granted, wherein the granted at least one service request comprises at least one service request received during a maximum time period of the time window that is started when a first service request with the indication of the identifier is received, and remaining service requests of the more than one service request based on the time window are not granted.

8. The method of claim 7, wherein based on the granted at least one service request, the method comprising:
    receiving an indication of the granted at least one service request, wherein the indication comprises at least one type of radio network temporary identifier, wherein the type of radio network temporary identifier is indicative to each network device of the at least one network device whether or not its service request was granted, and where the data communication for the network device is performed by the network node.

9. The method of claim 8, wherein the indication of the granted at least one service request comprises at least one of a cell radio type of network temporary identifier scrambled grant indicating that an associated data communication is granted or a single purpose type of radio network temporary identifier scrambled grant indicating that an associated data communication can be released.

10. The method of claim 7, wherein the identifier is unique to at least one of the network node or a cell of the communication network or the identifier is derived from a single purpose identification, and wherein the identifier is identifying a level of priority of the data communication.

11. The method of claim 7, wherein the information is communicated using uplink control information.

* * * * *